US012145694B2

(12) United States Patent
Sala

(10) Patent No.: US 12,145,694 B2
(45) Date of Patent: Nov. 19, 2024

(54) BICYCLE DERAILLEUR

(71) Applicant: TIEN HSIN INDUSTRIES CO., LTD., Taichung (TW)

(72) Inventor: Alfredo Sala, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 18/094,321

(22) Filed: Jan. 6, 2023

(65) Prior Publication Data
US 2024/0227982 A1 Jul. 11, 2024

(51) Int. Cl.
*B62M 9/126* (2010.01)
*B62M 9/124* (2010.01)
*B62M 9/1242* (2010.01)
*B62M 9/1244* (2010.01)
*B62M 9/1248* (2010.01)
*B62M 9/125* (2010.01)

(52) U.S. Cl.
CPC ............ *B62M 9/126* (2013.01); *B62M 9/124* (2013.01); *B62M 9/1244* (2013.01); *B62M 9/1248* (2013.01); *B62M 2009/12406* (2013.01); *B62M 9/1242* (2013.01); *B62M 9/125* (2013.01)

(58) Field of Classification Search
CPC ...... B62M 9/121; B62M 9/124; B62M 9/126; B62M 9/1248; B62M 2009/12406; B62M 9/1242; B62M 9/1244; B62M 9/125; F16D 41/069; F16D 41/07
See application file for complete search history.

(56) References Cited

U.S. PATENT DOCUMENTS

| | | | | |
|---|---|---|---|---|
| 3,181,383 A * | 5/1965 | Hippolyte | ............ | B62M 9/1244 474/82 |
| 4,850,940 A * | 7/1989 | Nagano | .................. | B62M 9/126 474/82 |
| 6,394,921 B1 * | 5/2002 | Fukuda | .................. | B62M 9/126 474/82 |
| 9,187,149 B2 * | 11/2015 | Yamaguchi | .......... | B62M 9/1244 |
| 9,290,235 B2 * | 3/2016 | Yamaguchi | ............ | B62M 9/124 |
| 9,463,846 B1 * | 10/2016 | Chang | .................. | B62M 9/1248 |
| 9,751,590 B2 * | 9/2017 | Shipman | .............. | B62M 9/1248 |
| 10,086,904 B2 * | 10/2018 | Lin | ......................... | B62M 9/124 |

(Continued)

FOREIGN PATENT DOCUMENTS

CN 106627974 A * 5/2017 ............ B62M 9/124

*Primary Examiner* — Michael R Mansen
*Assistant Examiner* — Raveen J Dias

(57) ABSTRACT

A bicycle derailleur includes following features. A chain guiding portion is adapted to be engaged with a bicycle chain and is adapted to guide a drive direction of the bicycle chain. A connecting portion is connected to a fixed portion and the chain guiding portion. A movable portion is pivotally connected to the connecting portion and the chain guiding portion. The movable portion includes a pressing member, a base, and a sprag clutch. The sprag clutch is disposed between the pressing member and the base. The pivot shaft is connected to the movable portion and the chain guiding portion, and is rotatably disposed through the pressing member, the sprag clutch and the base. The sprag clutch is driven to rotate when the pivot shaft rotates along the direction. The pressing member is adapted to press the sprag clutch to increase rotational resistance of the chain guiding portion.

17 Claims, 5 Drawing Sheets

(56) References Cited

U.S. PATENT DOCUMENTS

| | | | |
|---|---|---|---|
| 10,189,542 B2* | 1/2019 | Wu | B62M 9/1242 |
| 10,435,110 B2* | 10/2019 | Calendrille | B62M 9/127 |
| 10,759,494 B2* | 9/2020 | Shipman | B62M 9/1248 |
| 10,882,587 B2* | 1/2021 | Chang | B62M 9/126 |
| 11,427,282 B2* | 8/2022 | Sala | B62M 9/122 |
| 11,472,509 B2* | 10/2022 | Sala | B62M 9/125 |
| 11,498,644 B2* | 11/2022 | Sala | B62M 9/1242 |
| 11,577,804 B2* | 2/2023 | Braedt | B62M 9/121 |
| 11,667,350 B2* | 6/2023 | Chang | B62K 19/18 474/82 |
| 11,814,138 B1* | 11/2023 | Su | B62M 9/126 |
| 2009/0137354 A1* | 5/2009 | Oseto | B62M 9/126 474/82 |
| 2012/0083371 A1* | 4/2012 | Yamaguchi | B62M 9/126 474/80 |
| 2013/0288834 A1* | 10/2013 | Yamaguchi | B62M 9/126 474/80 |
| 2013/0310204 A1* | 11/2013 | Shahana | B62M 9/121 474/80 |
| 2014/0371013 A1* | 12/2014 | Yamaguchi | B62M 9/126 474/122 |
| 2016/0046352 A1* | 2/2016 | Shipman | B62M 9/16 29/428 |
| 2016/0176478 A1* | 6/2016 | Chang | B62M 9/126 474/69 |
| 2016/0304160 A9* | 10/2016 | Chang | B62M 9/121 |
| 2017/0113760 A1* | 4/2017 | Lin | B62M 9/1248 |
| 2017/0174289 A1* | 6/2017 | Wu | B62M 9/16 |
| 2017/0283004 A1* | 10/2017 | Calendrille | B62M 9/121 |
| 2017/0327183 A1* | 11/2017 | Shipman | B62M 9/16 |
| 2018/0370598 A1* | 12/2018 | Chang | B62M 9/126 |
| 2020/0130779 A1* | 4/2020 | Ma | B62M 9/125 |
| 2020/0166089 A1* | 5/2020 | Choltco-Devlin | F16D 27/09 |
| 2020/0369343 A1* | 11/2020 | Chiang | B62M 9/126 |
| 2021/0039748 A1* | 2/2021 | Braedt | B62M 9/128 |
| 2021/0070396 A1* | 3/2021 | Garcia | B62M 9/125 |
| 2021/0078673 A1* | 3/2021 | Chang | B62M 9/1248 |
| 2021/0129937 A1* | 5/2021 | Sala | H02J 7/02 |
| 2021/0129938 A1* | 5/2021 | Sala | B62M 9/1242 |
| 2021/0354782 A1* | 11/2021 | Eveleigh | B62M 9/1242 |
| 2022/0177076 A1* | 6/2022 | Peruzzo | B62M 9/1248 |
| 2022/0289337 A1* | 9/2022 | Hara | B62M 9/124 |
| 2022/0324534 A1* | 10/2022 | Brown | B62M 9/16 |

* cited by examiner

BICYCLE DERAILLEUR

FIELD OF THE INVENTION

The present invention relates to a derailleur, and more particularly to a bicycle derailleur.

BACKGROUND OF THE INVENTION

A bicycle sport has the functions of sightseeing tours and fitness, and the exercise intensity may be adjusted according to the route selection or the types of bicycles. As a result, in recent years, more and more people are engaged in the bicycle sport. Most bicycles are equipped with derailleurs, such that users can choose the appropriate gear according to different road conditions. Generally, a derailleur is equipped with multiple adjacent pinion gears, and a chain connected to a rear wheel (or a front wheel) is around one of the pinion gears. When a user performs gear shift, the derailleur can drive the bicycle chain to move, such that the bicycle chain is around another pinion gear and is kept in tension.

However, it is inevitable to encounter poorer road conditions during riding a bicycle, the bicycle is often rode over many obstacles with large height difference especially during passing off-road trails. In this case, the bicycle will hit the ground with a larger force, which leads to violent vibration of the derailleur accordingly, thus causing the bicycle chain to be loosed instantly. In this way, unexpected gear shift or even falloff of the bicycle chain easily occurs, which may even cause riding accidents in serious cases.

SUMMARY OF THE INVENTION

The present disclosure provides a bicycle derailleur to prevent a bicycle chain from being instantly loosed due to an external force.

The bicycle derailleur provided by the present disclosure includes a fixed portion, a chain guiding portion, a connecting portion, a movable portion, and a pivot shaft. The fixed portion is adapted to be fixed to a bicycle frame. The chain guiding portion is adapted to be engaged with a bicycle chain and is adapted to guide a drive direction of the bicycle chain. The connecting portion is connected to the fixed portion and the chain guiding portion. The movable portion is pivoted to the connecting portion and the chain guiding portion. The movable portion includes a pressing member, a base, and a sprag clutch. The pressing member is disposed at a side of the movable portion far from the chain guiding portion. The base is connected to the chain guiding portion. The sprag clutch is disposed between the pressing member and the base. The pivot shaft is connected to the movable portion and the chain guiding portion, and the pivot shaft is rotatably disposed on the pressing member, the sprag clutch and the base in a penetration manner. The pivot shaft is adapted to drive the chain guiding portion to rotate relative to the movable portion along a first direction or a second direction. The sprag clutch is adapted to block the pivot shaft from rotating along the second direction, and the sprag clutch is driven to rotate by the pivot shaft when the pivot shaft is rotated along the second direction. The pressing member is adapted to press the sprag clutch toward the base to inhibit rotation of the chain guiding portion driven by the pivot shaft along the second direction.

In an embodiment of the present disclosure, the above movable portion further includes, for example, a frictional element pressed against between the sprag clutch and the base.

In an embodiment of the present disclosure, a material of the above frictional element includes, for example, a non-metallic material or a composite material.

In an embodiment of the present disclosure, the above sprag clutch may include a clutch body and a clutch housing. The clutch body is disposed in the clutch housing, and the clutch housing is adapted to be pressed against between the pressing member and the base. The frictional element is pressed against between the clutch housing and the base. A material of the clutch housing includes stainless steel, carbon fiber, or plastic steel, and a material of the base includes aluminum alloy, carbon fiber, or plastic steel.

In an embodiment of the present disclosure, the above pressing member includes, for example, a disk spring. The movable portion may further include a shell body connected to a side of the base close to the connecting portion. The pressing member and the sprag clutch are disposed in an internal space formed by the base and the shell body. The disk spring is adapted to be pressed against between the shell body and the sprag clutch.

In an embodiment of the present disclosure, the above movable portion may further include a fastening element. The shell body has a top and a bottom opposite to the top. The bottom is connected to the base, and the disk spring is close to the top. The fastening element is disposed through the top, and the fastening element is adapted to fix the top to the shaft pivot and thus to press the disk spring via the top.

In an embodiment of the present disclosure, the above movable portion may further include at least one washer. The pivot shaft is further disposed through the top of the shell body, and the pivot shaft has an end protruding from the top. The washer is disposed at the end. The fastening element has a tooling part and a connecting part connected to the tooling part. The connecting part is disposed through the washer and the end, and the tooling part is adapted to press against the top via the washer.

In an embodiment of the present disclosure, the above fastening element includes, for example, a screw, and the end of the pivot shaft has a screw hole corresponding to the screw.

In an embodiment of the present disclosure, the above movable portion may further include a first sealing element and a shell body. The shell body is disposed on a side of the base close to the connecting portion, and the pressing member and the sprag clutch are disposed in an internal space formed by the base and the shell body. The first sealing element is sealed between the base and the shell body.

In an embodiment of the present disclosure, the above movable portion may further include a second sealing element and a housing. The housing is disposed outside the shell body, and the second sealing element is sealed between the housing and the shell body.

In an embodiment of the present disclosure, the above movable portion further includes, for example, a shaft seal sealed between the pivot shaft and the base.

In the bicycle derailleur according to the present disclosure, a rotational direction of the pivot shaft is limited via the movable portions by using the sprag clutch, and the sprag clutch is pressed by the pressing member. In detail, the sprag clutch will be engaged with the pivot shaft from rotating along the second direction, wherein the second direction is, for example, a chain loosing direction. Therefore, when the pivot shaft is rotated along the second direction, the pivot shaft can be engaged with the sprag clutch to rotate together. Since the sprag clutch is pressed by the pressing member, the sprag clutch cannot be instantly rotated along the second direction. Based on the above, the bicycle derailleur in the present disclosure can prevent the pivot shaft from driving the chain guiding portion to instantly rotate along the second direction, thereby preventing the bicycle chain from being instantly loosed due to the external force excluding gear shifting.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
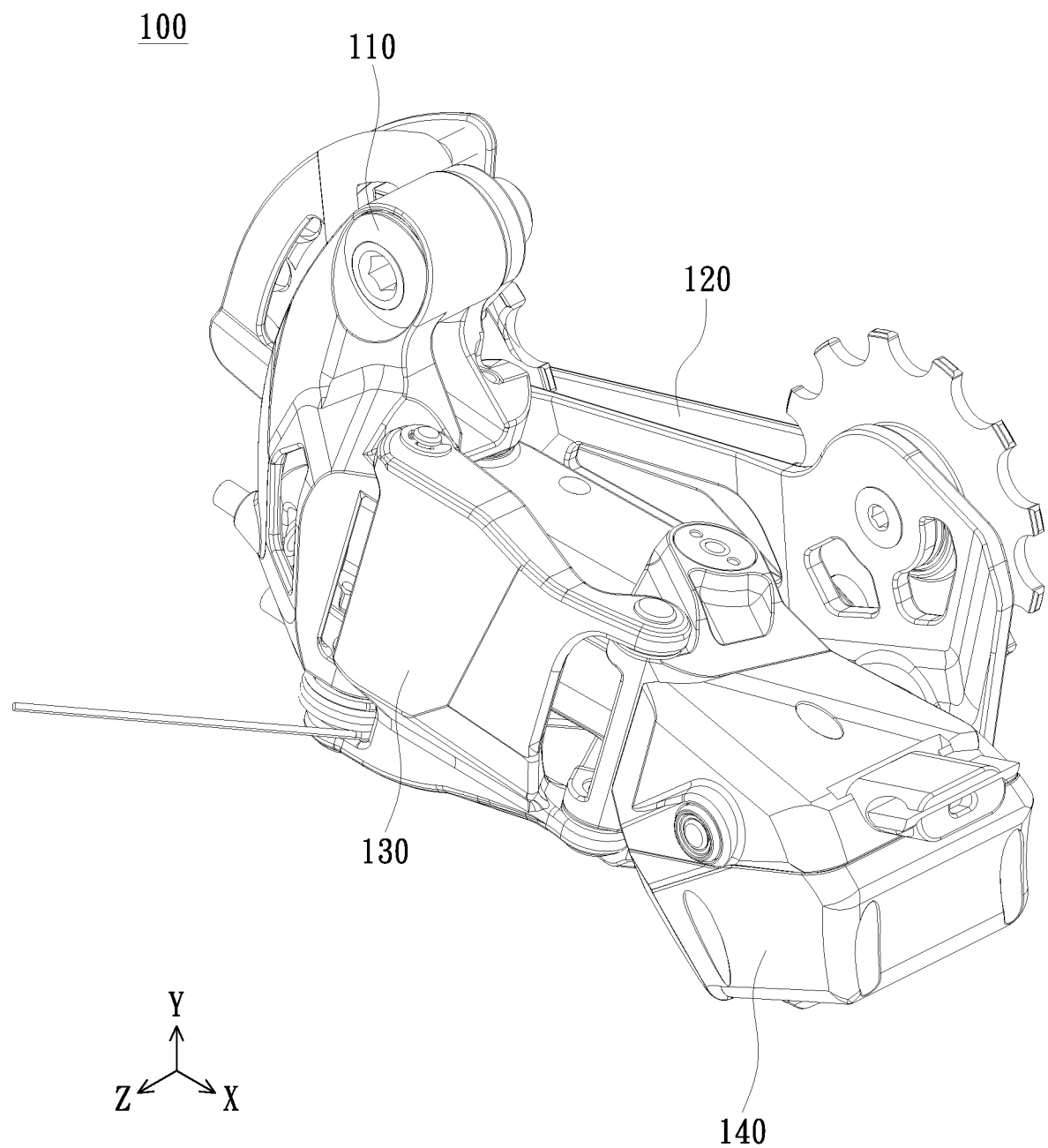
FIG. 1 is a schematic diagram of a bicycle derailleur in an embodiment of the present disclosure.
Figure 2:
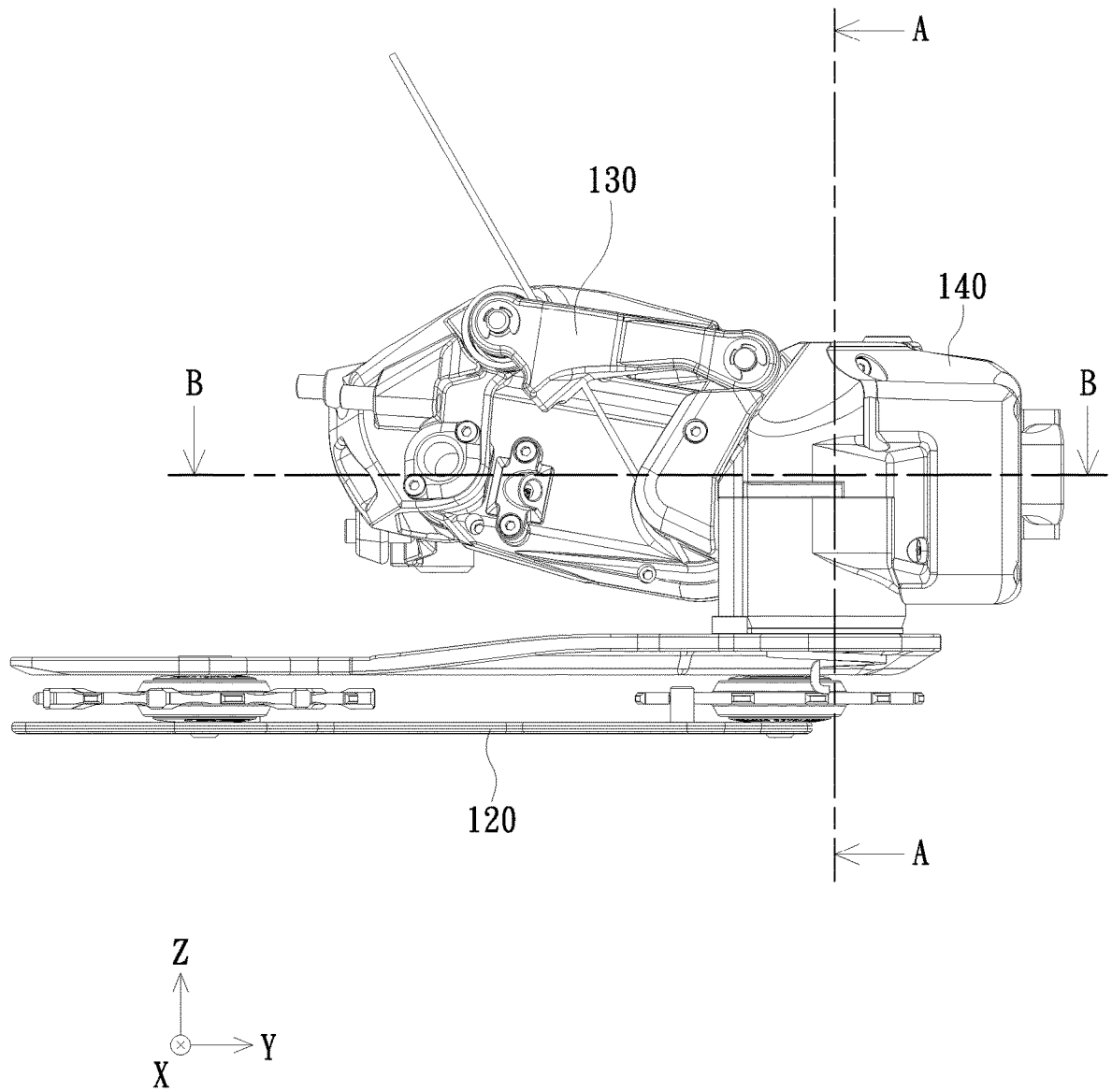
FIG. 2 is a schematic diagram with another visual angle of the bicycle derailleur in FIG. 1.
Figure 3:
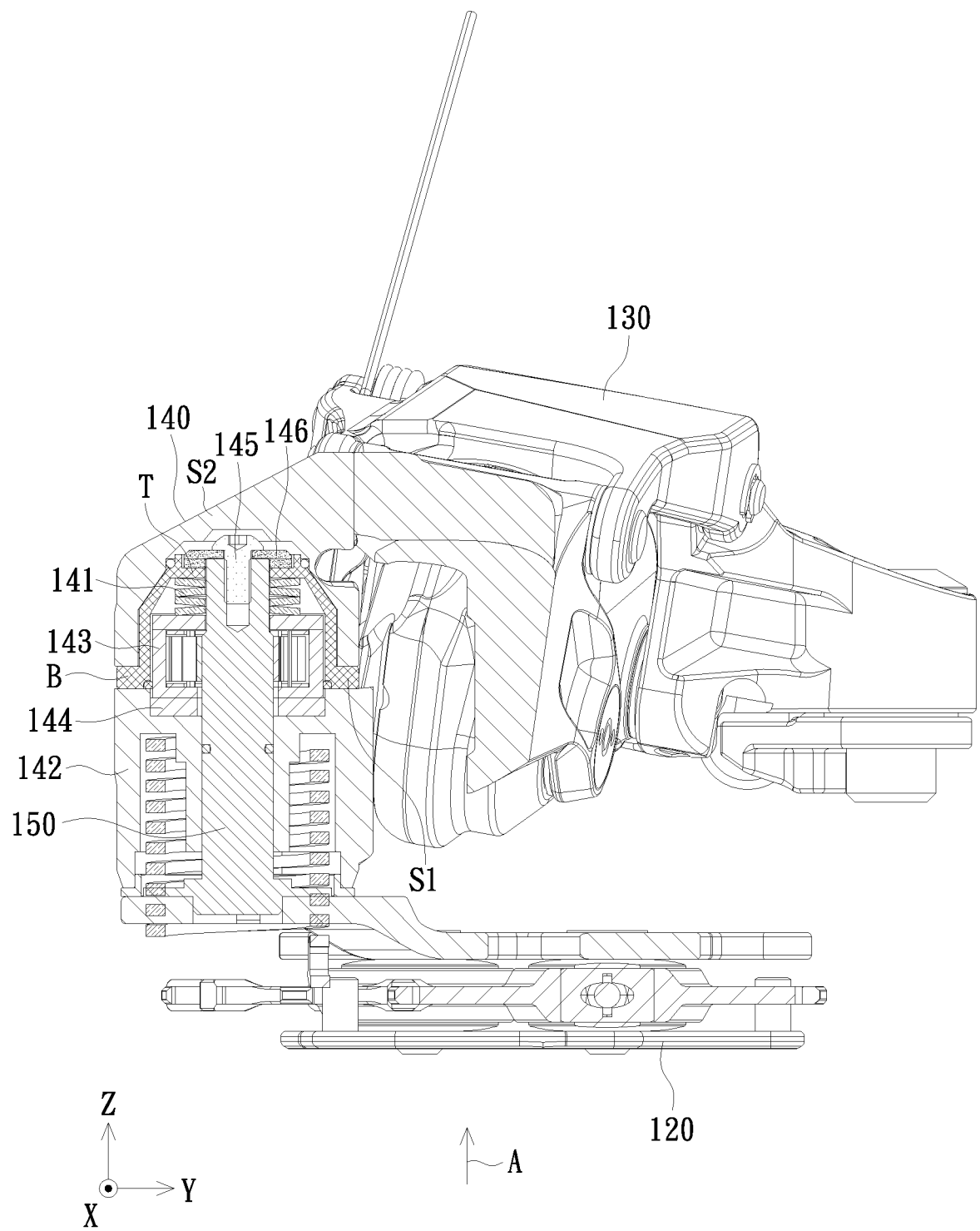
FIG. 3 is a schematic sectional view along a sectional line A-A in FIG. 2.
Figure 4:
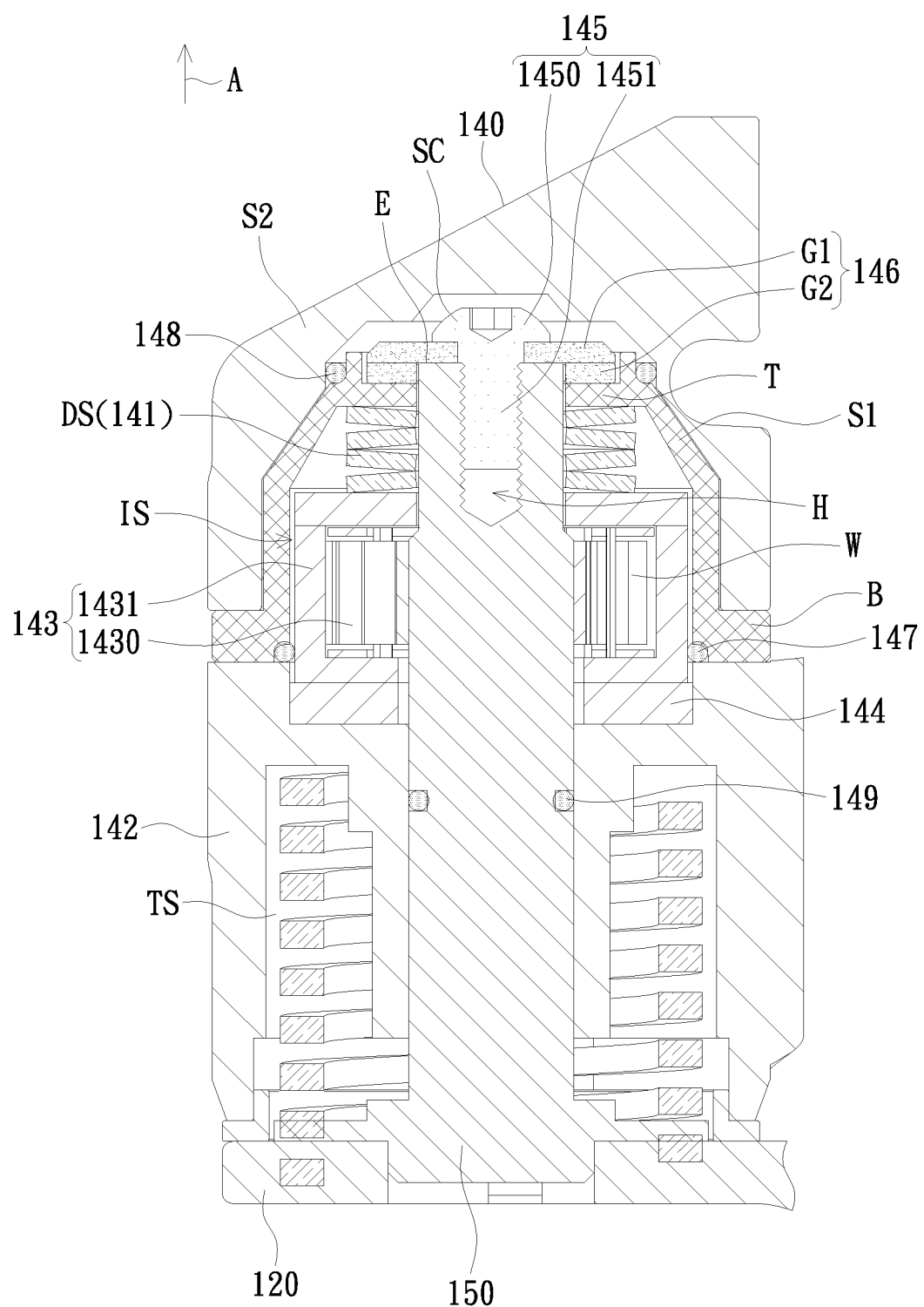
FIG. 4 is an enlarged schematic diagram of a movable portion in FIG. 3.
Figure 5:
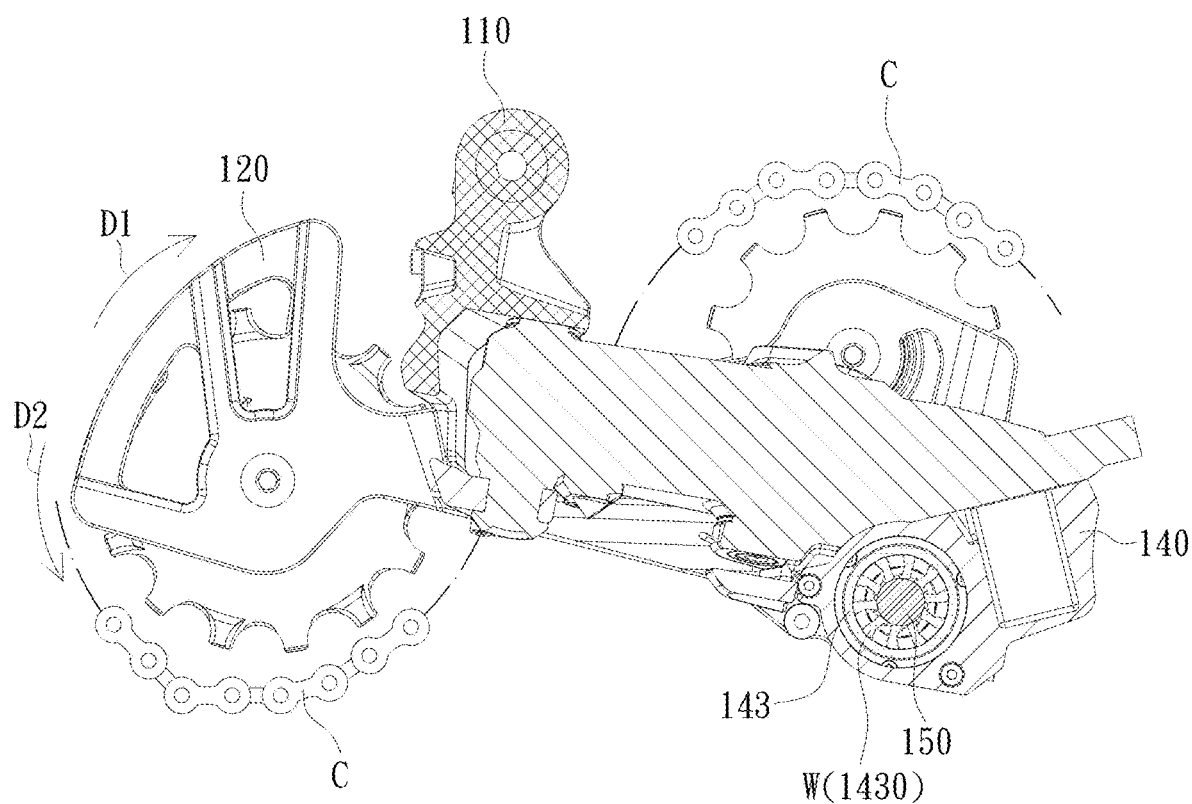
FIG. 5 is a schematic sectional view along a sectional line B-B in FIG. 2.

FIG. 1 is a schematic diagram of a bicycle derailleur in an embodiment of the present disclosure. FIG. 2 is a schematic diagram with another visual angle of the bicycle derailleur in FIG. 1. FIG. 3 is a schematic sectional view along a sectional line A-A in FIG. 2. FIG. 4 is an enlarged schematic diagram of a movable portion in FIG. 3. FIG. 5 is a schematic sectional view along a sectional line B-B in FIG. 2. It should be noted that FIG. 1, FIG. 2, FIG. 3 and FIG. 5 present a visual angle relationship by directions X, Y, and Z.

Please refer to FIG. 1 and FIG. 2 first, a bicycle derailleur 100 includes a fixed portion 110 (shown in FIG. 1), a chain guiding portion 120, a connecting portion 130, a movable portion 140 and a pivot shaft 150 (shown in FIG. 3). The fixed portion 110 is adapted to be fixed to a bicycle frame (not shown in figures). The chain guiding portion 120 is adapted to be engaged with a bicycle chain C (shown in FIG. 5), and the chain guiding portion 120 is adapted to guide a drive direction of the bicycle chain C. The connecting portion 130 is connected to the fixed portion 110. Please refer to FIG. 3 and FIG. 4, the movable portion 140 is pivoted to the connecting portion 130 and the chain guiding portion 120, and the movable portion 140 includes a pressing member 141, a base 142 and a sprag clutch 143. The pressing member 141 is disposed at a side of the movable portion 140 far from the chain guiding portion 120. The base 142 is connected to the chain guiding portion 120. The sprag clutch 143 is disposed between the pressing member 141 and the base 142. The pivot shaft 150 is connected to the movable portion 140 and the chain guiding portion 120, and the pivot shaft 150 is rotatably disposed through the pressing member 141, the sprag clutch 143 and the base 142. Please refer to FIG. 4 and FIG. 5 together, the pivot shaft 150 is adapted to drive the chain guiding portion 120 to rotate relative to the movable portion 140 along a first direction D1 or a second direction D2 (shown in FIG. 5). The sprag clutch 143 is adapted to be engaged with the pivot shaft 150 from rotating along the second direction D2, and the sprag clutch 143 is driven to rotate by the pivot shaft 150 when the pivot shaft 150 is rotated along the second direction D2. The pressing member 141 is adapted to press the sprag clutch 143 toward the base 142 to increase rotational resistance of the chain guiding portion 120 driven by the pivot shaft 150 along the second direction D2.

Please refer to FIG. 1 again, the fixed portion 110 may be fixed to the bicycle frame via a screw (not shown in figures). In this embodiment, the fixed portion 110 is screwed to a derailleur hanger of a chain stay of the bicycle frame, but other embodiments are not limited thereto.

Please refer to FIG. 1 and FIG. 5 together, the chain guiding portion 120 in this embodiment may allow the bicycle chain C disposing through, so as to guide the bicycle chain C to drive a freewheel (not shown in figures) and a chainring (not shown in figures) to rotate.

As shown in FIG. 2, two opposite ends of the connecting portion 130 may be pivoted to the movable portion 140 and the fixed portion 110. In detail, after the connecting portion 130 is actuated by performing gear shift, the chain guiding portion 120 may be driven by the connecting portion 130 to move relative to the fixed portion 110 along the direction Z or a direction opposite to the direction Z. Hence, please refer to FIG. 2 and FIG. 5 together, the chain guiding portion 120 can guide the bicycle chain C to be around different pinion gears (not shown in figures) to finish gear shift. In addition, during the above gear shift, the chain guiding portion 120 is rotated along the first direction D1 or the second direction D2 to keep the bicycle chain C in tension. It should be noted that when the connecting portion 130 is not actuated by performing the gear shift, if the chain guiding portion 120 is rotated along the second direction D2 by other external forces excluding gear shifting, the bicycle chain C may be loosed instantly, thereby resulting in unexpected gear shift or even the bicycle chain C come off. Therefore, the movable portion 140 in this embodiment can prevent the chain guiding portion 120 from being instantly rotated along the second direction D2 by other external forces excluding gear shifting, and please read the description below for details.

As shown in FIG. 3 and FIG. 4, the base 142 of the movable portion 140 may allow the pivot shaft 150 passing through, so as to make the pivot shaft 150 be pivoted to the chain guiding portion 120. In detail, please continue to refer to FIG. 4, and also refer to FIG. 5 together, the base 142 includes, for example, a torsion spring TS (marked in FIG. 4). The torsion spring TS can provide a pre-tensioning force for the pivot shaft 150 to prevent the chain guiding portion 120 from unexpectedly being rotated along the second direction D2 during gear shift, thereby keeping the bicycle chain C in tension.

The sprag clutch 143 of the movable portion 140 may include a clutch body 1430 and a clutch housing 1431, wherein the clutch body 1430 includes, for example, a plurality of sprags W; the pivot shaft 150 is disposed between the sprags W, and the pivot shaft 150 is engaged with the sprag clutch 143 when rotating along the second direction D2. As previously mentioned, when the pivot shaft 150 is rotated along the second direction D2, the entire sprag clutch 143 can be driven by the pivot shaft 150 to rotate relative to the base 142. As a result, a speed of the sprag clutch 143 rotating along the second direction D2 can be inhibited by a frictional force between the sprag clutch 143 and the base 142, thereby preventing the chain guiding portion 120 from being instantly rotated along the second direction D2. It can be understood that the chain guiding portion 120 may be slowly rotated along the second direction D2 or may be remain stationary according to the static frictional force between the sprag clutch 143 and the base 142.

Please refer to FIG. 3 and FIG. 4 together again, it is worth mentioning that the movable portion 140 further includes, for example, a frictional element 144. The frictional element 144 is located between and is pressed against between the sprag clutch 143 and the base 142. Hence, the frictional force between the sprag clutch 143 and the base 142 can be adjusted through different materials, thereby further inhibiting the rotation of the chain guiding portion 120 driven by the pivot shaft 150 along the second direction D2 (shown in FIG. 5). Further, a material of the frictional element 144 includes, for example, a non-metallic material or a composite material. For example, the non-metallic material may include rubber, silica gel or other materials with a larger friction coefficient, and the composite material may include glass fiber, carbon fiber or ceramic, but the present disclosure is not limited thereto. In addition, the frictional force between the sprag clutch 143 and the base 142 is affected by the material type. For example, in this embodiment, the clutch body 1430 is disposed in the clutch housing 1431, and the clutch housing 1431 is located between the pressing member 141 and the base 142, and the clutch body 1430 is adapted to be pressed by the pressing member 141. The frictional element 144 is located between and is pressed against between the clutch housing 1431 and the base 142. A material of the clutch housing 1431 may include stainless steel, carbon fiber or plastic steel, and a material of the base 142 may include aluminum alloy, carbon fiber or plastic steel (also referred to as Polyoxymethylene (POM)). It can be understood that in an embodiment, the sprag clutch 143 and the base 142 can be made by other materials to change the frictional force, and in a case that the above frictional force is large enough, the frictional element 144 may be omitted.

The normal force between the sprag clutch 143 and the base 142 can be adjusted by the pressing member 141. In this embodiment, the pressing member 141 includes, for example, a disk spring DS (marked in FIG. 4). The movable portion 140 may further include a shell body S1, and the shell body S1 is connected to a side of the base 142 close to the connecting portion 130 (shown in FIG. 3). The pressing member 141 and the sprag clutch 143 are disposed in an internal space IS formed by the base 142 and the shell body S1. The disk spring DS is located between the shell body S1 and the sprag clutch 143, and the disk spring DS is adapted to be pressed against between the shell body S1 and the sprag clutch 143. In this way, the frictional force between the sprag clutch 143 and the base 142 can be adjusted via the disk spring DS. Specifically, the larger a pressure the sprag clutch 143 pressed by the disk spring DS is, the larger the frictional force between the sprag clutch 143 and the base 142 is. On the contrary, the less the pressure the sprag clutch 143 pressed by the disk spring DS is, the less the frictional force between the sprag clutch 143 and the base 142 is.

Incidentally, the movable portion 140 may further include a housing S2, and the housing S2 is disposed outside the shell body S1. For example, the housing S2 is detachably fixed to the shell body S1, such that the housing S2 can be disassembled to adjust the pressure the sprag clutch 143 pressed by the disk spring DS. However, in an embodiment, the housing S2 may be provided with a pressing piece (not shown in figures) connected to the pressing member 141. Hence, the pressure the sprag clutch 143 pressed by the disk spring DS may be adjusted via the above pressing piece, thereby omitting the above step of disassembling the housing S2.

In this embodiment, the movable portion 140 may further include a fastening element 145. The shell body S1 has a top T and a bottom B opposite to the top T. The bottom B is connected to the base 142, and the disk spring DS is close to the top T. Incidentally, the bottom B in this embodiment has, for example, an opening, and the sprag clutch 143 may be closer to the bottom B than the disk spring DS. The fastening element 145 is disposed through the top T, and the fastening element 145 is adapted to fix the top T to the shaft pivot 150 and thus to press the disk spring DS via the top T. The fastening element 145 is adapted to move relative to the top T to apply a pressure to the disk spring DS pressed by the top T, so as to apply the frictional force between the sprag clutch 143 and the base 142. Further, for example, the top T and the bottom B are located at two opposite ends of the pivot shaft 150 along an axial direction A of the pivot shaft 150, wherein the top T may be located between the disk spring DS and the fastening element 145. In addition, the disk spring DS may be disposed through the pivot shaft 150 along the axial direction A, and the disk spring DS is pressed against between the sprag clutch 143 and the top T; the fastening element 145 may be moved back and forth along the axial direction A, and the disk spring DS can be pressed by the top T. Hence, the pressure on the disk spring DS can be increased by pushing the fastening element 145 toward the top T; on the contrary, the pressure on the disk spring DS can be reduced by moving the fastening element 145 in a direction away from the top T.

Please continue to refer to FIG. 4, furthermore, the movable portion 140 may further include at least one washer 146 (also marked in FIG. 3), and there are two washers 146 in this embodiment. The pivot shaft 150 may also be further disposed through the top T of the shell body S1, and the pivot shaft 150 has an end E protruding from the top T. The washer 146 is disposed at the end E. The fastening element 145 includes a tooling part 1450 and a connecting part 1451 connected to the tooling part 1450. The connecting part 1451 is disposed through the washer 146 and the end E, and the tooling part 1450 is adapted to press the top T via the washer 146. In short, the top T of the shell body S1 is pressed by the fastening element 145 via the washer 146. Hence, the pressure on the disk spring DS can be applied to the washer 146 through the fastening element 145. Incidentally, the washers 146 in this embodiment include, for example, two washers G1 and G2, and the washer G1 and G2 are respectively sleeved on the pivot shaft 150 and the connecting part 1451 of the fastening element 145. However, the number of washers is not limited in the present disclosure. In this embodiment, the fastening element 145 includes, for example, a screw SC, and the end E of the pivot shaft 150 has a screw hole H corresponding to the screw SC. In detail, the tooling part 1450 may include a head of the screw SC, and the connecting part 1451 may include a tooth of the screw SC. However, the specific structure of the fastening element 145 is not limited in other embodiments.

The movable portion 140 may further include a first sealing element 147. The first sealing element 147 is sealed between the base 142 and the shell body S1 to prevent water vapor from infiltrating into the internal space IS, thereby preventing the parts from rusting. For example, the first sealing element 147 in this embodiment may prevent the sprag clutch 143 from rusting, but other embodiments are not limited thereto. In addition, in this embodiment, the movable portion 140 may further include a second sealing element 148, and the second sealing element 148 is sealed between the housing S2 and the shell body S1 to prevent the parts between the housing S2 and the shell body S1 from rusting due to water vapor infiltration. For example, the second sealing element 148 in this embodiment may prevent the fastening element 145 and the pressing member 141 from rusting, but the present disclosure is not limited thereto. Similarly, the movable portion 140 further includes, for example, a shaft seal 149, and the shaft seal 149 is sealed between the pivot shaft 150 and the base 142 to prevent the water vapor from infiltrating into the internal space IS. For example, the shaft seal 149 may prevent the sprag clutch 143 from rusting due to water vapor infiltration, but the present disclosure is not limited thereto.

In summary, in the bicycle derailleur according to the present disclosure, the rotational direction of the pivot shaft is limited via the movable portion by using the sprag clutch, and the sprag clutch is pressed by the pressing member. In detail, the sprag clutch can be engaged with the pivot shaft from rotating along the second direction, wherein the second direction is, for example, a chain loosing direction. Therefore, when the pivot shaft is rotated along the second direction, the pivot shaft can be engaged with the sprag clutch to rotate together. Since the sprag clutch is pressed by the pressing member, the sprag clutch cannot be instantly rotated along the second direction. Based on the above, the bicycle derailleur in the present disclosure can prevent the pivot shaft from driving the chain guiding portion to instantly rotate along the second direction, thereby preventing the bicycle chain from being instantly loosed due to the external force excluding gear shifting.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bicycle derailleur, comprising:
    a fixed portion adapted to be fixed to a bicycle frame;
    a chain guiding portion adapted to be engaged with a bicycle chain, and the chain guiding portion adapted to guide a drive direction of the bicycle chain;
    a connecting portion connected to the fixed portion;
    a movable portion pivoted to the connecting portion and the chain guiding portion, the movable portion comprising:
    a pressing member disposed at a side of the movable portion far from the chain guiding portion;
    a base connected to the chain guiding portion; and
    a sprag clutch disposed between the pressing member and the base; and
    a pivot shaft connected to the movable portion and the chain guiding portion, and the pivot shaft rotatably passing through the pressing member, the sprag clutch and the base, the pivot shaft adapted to drive the chain guiding portion to rotate relative to the movable portion along a first direction or a second direction;
    wherein the sprag clutch is adapted to be engaged with the pivot shaft from rotating along the second direction, and the sprag clutch is driven to rotate by the pivot shaft when the pivot shaft is rotated along the second direction, and the pressing member is adapted to press the sprag clutch toward the base to increase rotational resistance of the chain guiding portion driven by the pivot shaft along the second direction;
    wherein the sprag clutch comprises a clutch body and a clutch housing, the clutch body is disposed in the clutch housing, the clutch housing is located between the pressing member and the base, and the clutch housing is adapted to be pressed by the pressing member;
    wherein the clutch body comprises a plurality of sprags, the pivot shaft is disposed between the sprags, and the pivot shaft is engaged with the sprag clutch when rotating along the second direction;
    wherein the pressing member comprises a disk spring, the movable portion further comprises a shell body, the shell body is connected to a side of the base close to the connecting portion, the pressing member and the sprag clutch are disposed in an internal space formed by the base and the shell body, and the disk spring is located between the shell body and the sprag clutch, and the disk spring is adapted to be pressed against the shell body and the sprag clutch;
    wherein the movable portion further comprises a fastening element, the shell body has a top and a bottom opposite to the top, the bottom is connected to the base, the disk spring is close to the top, the fastening element passes through the top, and the fastening element is adapted to fix the top to the pivot shaft and thus to press the disk spring via the top;
    wherein the movable portion further comprises at least one washer, the pivot shaft further passes through the top of the shell body, and the pivot shaft has an end protruding from the top, the at least one washer is disposed at the end, the fastening element has a tooling part and a connecting part connected to the tooling part, the connecting part passes through the at least one washer and the end, and the tooling part is adapted to press against the top via the washer.

2. The bicycle derailleur according to claim 1, wherein the movable portion further comprises a frictional element located between and pressed against the sprag clutch and the base.

3. The bicycle derailleur according to claim 2, wherein a material of the frictional element comprises a non-metallic material or a composite material.

4. The bicycle derailleur according to claim 2, wherein the frictional element is located between and is pressed against the clutch housing and the base, a material of the clutch housing comprises stainless steel, carbon fiber, or plastic steel, and a material of the base comprises aluminum alloy, carbon fiber, or plastic steel.

5. The bicycle derailleur according to claim 1, wherein the fastening element comprises a screw, and the end of the pivot shaft has a screw hole corresponding to the screw.

6. The bicycle derailleur according to claim 1, wherein the movable portion further comprises a first sealing element, the shell body is disposed on the side of the base close to the connecting portion, and the first sealing element is sealed between the base and the shell body.

7. The bicycle derailleur according to claim 6, wherein the movable portion further comprises a second sealing element and a housing, the housing is disposed outside the shell body, and the second sealing element is sealed between the housing and the shell body.

8. The bicycle derailleur according to claim 1, wherein the movable portion further comprises a shaft seal sealed between the pivot shaft and the base.

9. A bicycle derailleur, comprising:
a fixed portion adapted to be fixed to a bicycle frame;
a chain guiding portion adapted to be engaged with a bicycle chain, and the chain guiding portion adapted to guide a drive direction of the bicycle chain;
a connecting portion connected to the fixed portion;
a movable portion pivoted to the connecting portion and the chain guiding portion, the movable portion comprising:
  a pressing member disposed at a side of the movable portion far from the chain guiding portion;
  a base connected to the chain guiding portion; and
  a sprag clutch disposed between the pressing member and the base; and
a pivot shaft connected to the movable portion and the chain guiding portion, and the pivot shaft rotatably passing through the pressing member, the sprag clutch and the base, the pivot shaft adapted to drive the chain guiding portion to rotate relative to the movable portion along a first direction or a second direction;
wherein the sprag clutch is adapted to be engaged with the pivot shaft from rotating along the second direction, and the sprag clutch is driven to rotate by the pivot shaft when the pivot shaft is rotated along the second direction, and the pressing member is adapted to press the sprag clutch toward the base to increase rotational resistance of the chain guiding portion driven by the pivot shaft along the second direction;
wherein the sprag clutch comprises a clutch body and a clutch housing, the clutch body is disposed in the clutch housing, the clutch housing is located between the pressing member and the base, and the clutch housing is adapted to be pressed by the pressing member;
wherein the clutch body comprises a plurality of sprags, the pivot shaft is disposed between the sprags, and the pivot shaft is engaged with the sprag clutch when rotating along the second direction;
wherein the movable portion further comprises a first sealing element, the shell body is disposed on a side of the base close to the connecting portion, the pressing member and the sprag clutch are disposed in an internal space formed by the base and the shell body, and the first sealing element is sealed between the base and the shell body;
wherein the movable portion further comprises a second sealing element and a housing, the housing is disposed outside the shell body, and the second sealing element is sealed between the housing and the shell body.

10. The bicycle derailleur according to claim 9, wherein the movable portion further comprises a frictional element located between and pressed against the sprag clutch and the base.

11. The bicycle derailleur according to claim 10, wherein a material of the frictional element comprises a non-metallic material or a composite material.

12. The bicycle derailleur according to claim 10, wherein the frictional element is located between and is pressed against the clutch housing and the base, a material of the clutch housing comprises stainless steel, carbon fiber, or plastic steel, and a material of the base comprises aluminum alloy, carbon fiber, or plastic steel.

13. The bicycle derailleur according to claim 9, wherein the pressing member comprises a disk spring, the shell body is connected to the side of the base close to the connecting portion, and the disk spring is located between the shell body and the sprag clutch, and the disk spring is adapted to be pressed against the shell body and the sprag clutch.

14. The bicycle derailleur according to claim 13, wherein the movable portion further comprises a fastening element, the shell body has a top and a bottom opposite to the top, the bottom is connected to the base, the disk spring is close to the top, the fastening element passes through the top, and the fastening element is adapted to fix the top to the pivot shaft and thus to press the disk spring via the top.

15. The bicycle derailleur according to claim 14, wherein the movable portion further comprises at least one washer, the pivot shaft further passes through the top of the shell body, and the pivot shaft has an end protruding from the top, the at least one washer is disposed at the end, the fastening element has a tooling part and a connecting part connected to the tooling part, the connecting part passes through the at least one washer and the end, and the tooling part is adapted to press against the top via the washer.

16. The bicycle derailleur according to claim 15, wherein the fastening element comprises a screw, and the end of the pivot shaft has a screw hole corresponding to the screw.

17. The bicycle derailleur according to claim 9, wherein the movable portion further comprises a shaft seal sealed between the pivot shaft and the base.

* * * * *